July 5, 1955 L. M. LEEDS 2,712,616

CATHODE RAY BEAM DEFLECTION CIRCUITS

Filed March 2, 1953

Inventor:
Laurance M Leeds,
by Charles M. Hutchins
His Attorney.

United States Patent Office 2,712,616

Patented July 5, 1955

2,712,616

CATHODE RAY BEAM DEFLECTION CIRCUITS

Laurance M. Leeds, Syracuse, N. Y., assignor to General Electric Company, a corporation of New York Application March 2, 1953, Serial No. 339,791

6 Claims. (Cl. 315—27)

The present invention relates to cathode ray beam deflection circuits and has for a general object thereof to provide improvements in circuits of this kind.

The present invention has particular application in the field of television where deflection circuits are utilized to cause the cathode ray beam of a cathode ray tube to scan periodically the screen thereof. Deflection circuits of this kind usually include a deflection coil and a transformer which supplies deflection currents to the coil to produce the periodic scanning. In the scanning operation the beam is caused by currents through the coils to gradually traverse the screen from one side thereof to the other side thereof after which the beam is rendered blank for a certain interval during which time a change in current is caused in the deflection coil so that after the blanking interval the beam can be again caused to traverse the screen from one end to the other in the same direction as the preceding scan.

An auxiliary winding is also coupled to the transformer supplying the deflection coil for the purpose of developing a high voltage which is rectified and utilized in the operation of the cathode ray tube. When this is done the deflection circuit operation is altered in a manner that the aforementioned deflection currents cannot be returned to the proper condition during the blanking interval; consequently, undesired effects are produced on the screen of the tube.

Applicant's invention in its particular aspects is directed to providing a deflection circuit which includes an auxiliary winding for obtaining high voltage and which at the same time functions to return the aforementioned deflection current to the desired condition during the aforementioned blanking interval.

In carrying the present invention into effect the high voltage winding of the transformer is arranged with respect to the winding supplying the deflection coil with deflection currents in a manner that the impedance reflected to the latter from the former is of such a character to render substantially unaltered the current through said coil after said blanking interval.

Figure 1:
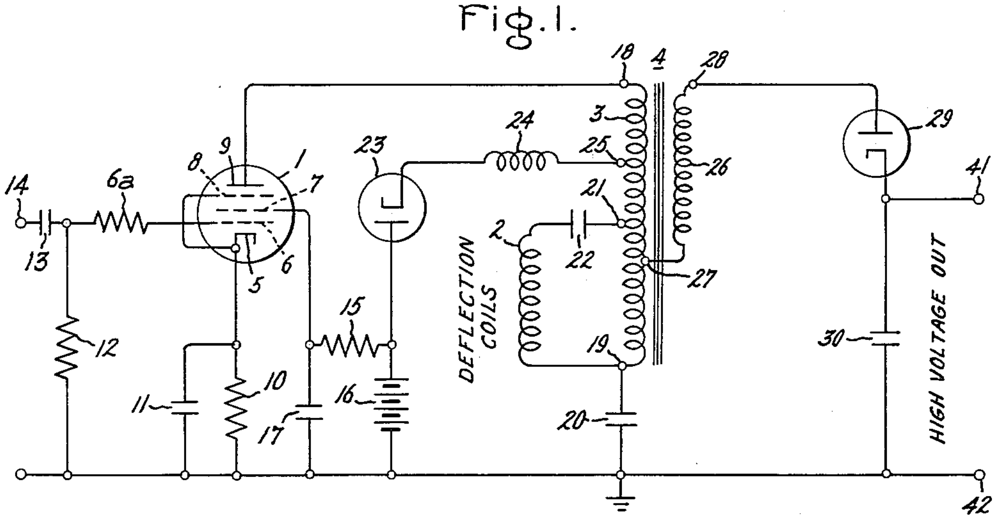
Figure 2:
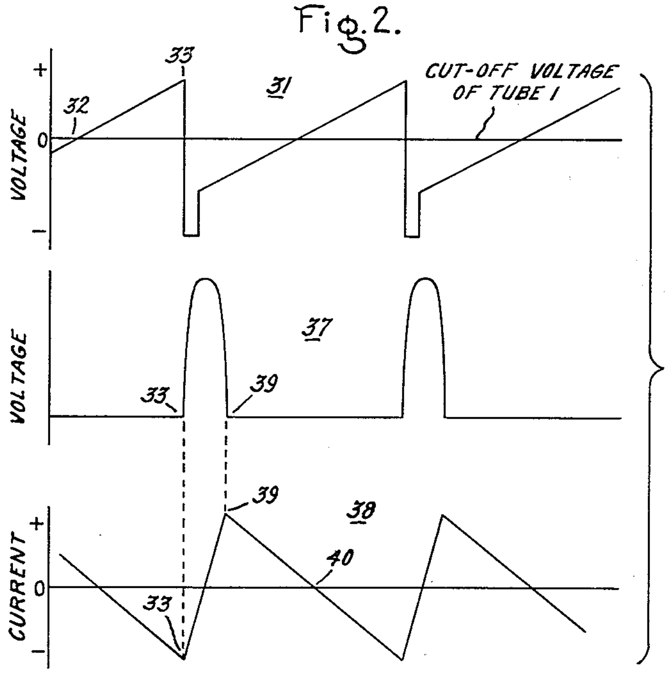

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a schematic representation of an embodiment of the present invention; Fig. 2 shows graphs useful in explaining the operation of the invention.

Reference is now made to Fig. 1 which shows an illustrative embodiment of the present invention. In this figure is shown an electron discharge device 1 which functions as an amplifier to provide cyclically varying currents to the deflection coil 2 through winding 3 of transformer 4. The electron discharge device comprises a cathode 5, a grid 6, a screen grid 7, a suppressor grid 8 and an anode 9. The cathode 5 is connected to ground through a biasing resistor 10 bypassed by bypass capacitor 11. The grid 6 is connected through a parasitic suppression resistor 6*a* and grid leak resistor 12 to ground and also through parasitic suppression resistor 6*a* and capacitor 13 to the input terminal 14. The screen grid is connected through voltage dropping resistor 15 to the positive terminal of source 16, the negative terminal of which is connected to ground. The screen grid 7 is bypassed to ground through bypass capacitor 17. The suppressor grid 8 is connected to the cathode 5. The anode 9 is connected to one terminal 18 of the transformer winding 3, the other terminal 19 of which is connected through bypass capacitor 20 to ground. Deflection coils 2 are connected across a portion of the winding 3, as shown, between terminals 19 and 21 through linearizing capacitor 22.

Energizing voltage is supplied to the anode 9 from the source 16 by means of connection from the positive terminal of the source 16 to the positive terminal of unilaterally conducting device 23, the negative terminal of which is connected through a choke 24 to tap 25 of winding 3. Another winding 26 has one terminal connected to a point 27 on winding 3. The other terminal 28 of the winding 26 is connected through a unilaterally conducting device 29 and a storage capacitor 30 connected in series to ground. The alternating voltage appearing between terminals 19 and 28 is rectified by the unilaterally conducting device 29 and appears as a rectified high voltage across capacitor 30. The winding 26 is arranged to have many more turns than winding 3 and further the terminal 27 of winding 26 is tapped at a point on winding 3 to utilize some of the alternating voltage developed thereacross and at the same time is tapped with respect to tap 21 so that the capacitance existing in the former circuit reflected into the latter circuit is kept at a minimum with the beneficial result to be explained below.

Referring now to Fig. 2 there are shown graphs of the voltage and current waveforms useful in explaining the operation of the circuit of Fig. 1. In the graph 31, the abscissa represents time and the ordinate represents the general form of the voltage wave applied between terminals 14 and ground of Fig. 1. In graph 37, the abscissa represents time and the ordinate represents the voltage across deflection coil 2. In graph 38, the abscissa represents time and the ordinate represents current flowing through deflection coil 2. The graphs of Fig. 2 are drawn to the same time scale and points on the graphs lying in a straight line perpendicular to the time axis represent generally simultaneous conditions of voltage and current in the circuit of Fig. 1.

Referring now to the operation of the circuit of Fig. 1, assume for the purpose of explanation that winding 26 and rectifier 29 are disconnected. A voltage represented by the graph 31 of Fig. 2 is applied between terminal 14 and ground. As the voltage at the grid 6 increases from point 32 of graph 31, a current of increasing amplitude is caused to flow through the transformer winding 3, producing a flow of current in the deflection coil 2 as shown in graph 38, as a result of the conductive coupling connection of the deflection coil 2 through linearizing capacitor 22 to taps 19 and 21 of the winding 3. When the current through the deflection coil 2 and winding 3 reaches a maximum, the energy stored in the magnetic fields surrounding the deflection coil 2 and winding 3 is also at a maximum. At this instant, represented by point 33 on graph 31, the voltage variation applied to the input terminal 14 is driven negative very rapidly, and cuts off current through electron discharge device 1. The result of the sudden termination of current flow through winding 3 is to cause the magnetic fields surrounding the deflection coil 2 and winding 3 to suddenly collapse. This action initiates a self oscillation of high frequency in the equivalent tuned circuit consisting of the deflection coil 2, the transformer winding 3, and the distributed, stray and fixed capacities of the circuit. This combination of elements tends to oscillate at the natural, or free frequency, of the combination.

The current through the deflection coil 2 reverses rapidly during the first quarter cycle of such oscillation, passes through zero, and continues to a maximum in the reverse direction at the end of the second quarter cycle of such oscillation, as shown between points 33 and 39 of graph 38. This rapid reversal of current through the deflection coil 2, initiated by the rapid cut-off of current in electron discharge device 1, commencing at point 33 as represented by graph 31, constitutes the flyback or retrace time of the scansion. During this retrace period the voltage across the deflection coil 2 is substantially as shown in graph 37 as that portion between points 33 and 39.

During the aforementioned first half cycle of oscillation the energy in the deflection circuit flows out of the magnetic fields into the circuit capacitances and back into the magnetic fields, with some loss because of unavoidable resistances of the circuits. At the end of this first half cycle of oscillation the potential applied to the cathode of unilateral conducting device 23, as a result of attempted continuation of the oscillation, is such as to cause device 23 to conduct, and the low impedance of this damper tube 23, as reflected across the deflection system, results in a damping out of subsequent oscillations.

Following the end of one half cycle of oscillation the energy stored in the magnetic fields of deflection coil 2 and transformer winding 3 causes current to flow through the deflection coil 2, transformer winding 3, and damper tube 23, as represented by the portion of the scansion cycle between points 39 and 40 of graph 38. Discharge device 1 begins conduction slightly before the middle of the scanning trace to produce further deflection of the beam and a repetition of the aforementioned operation.

When auxiliary winding 26, associated rectifier 29 and storage capacitor 30 are connected to winding 3, a positive voltage pulse is obtained at terminal 28 during the retrace period through the conductive connection at tap 27 and through mutual induction between winding 3 and winding 26.

The time interval of retrace or flyback, corresponding to the first half cycle of free oscillation of the combination of elements, is determined primarily by the effective inductance and capacitance of the system as observed across the terminals of the deflection coil 2. By way of example as to how the stray capacitance may be effectively increased consider the stray capacitance of discharge device 1. This capacitance appears to the terminals of the deflection coil as having been multiplied by the square of ratio of the turns between taps 18 and 19 of winding 3 to the turns between taps 21 and 19. In an analogous manner the spacial and shunting capacitance of winding 26 together with the stray capacitance of unilaterally conducting device 29 and associated wiring would be greatly magnified if the lower end of winding 26 was returned to tap 18 as has always been done in the prior art. By connecting the lower end of winding 26 to tap 27 which is further down on the winding 3 than is tap point 21 the effective capacitance of the complete auxiliary circuit, which is quite appreciable, is actually reflected to the deflection coil 2 terminals reduced by the square of the ratio of the turns of the winding 3 between points 21 and 19 to the turns of winding 3 between points 27 and 19.

The present invention has particular application in the field of television particularly in those applications where blanking requirements are such as to require the cathode ray beam to retrace in extremely short times. In an actual system making use of a transformer composed of a number of universal windings the retrace time was reduced from 7 microseconds to 4 microseconds by connecting the lower end of winding 26 to a tap 27 somewhat below tap 21. In this system, which operated at a much higher scansion rate than customary black and white television, the horizontal blanking time permitted was only 5 microseconds, hence a much faster retrace time than that which has been achieved in the prior art was essential.

In the operation of a particular circuit of the kind described, it was found that with the winding between terminals 19 and 27 including from about one half to two thirds of the turns between terminals 19 and 21 that a short retrace time, as desired, was obtained without appreciably affecting the high voltage supplied to the load connected to terminals 41 and 42. When the tap 27 was lowered beyond the half way point between terminals 21 and 19 toward terminal 19, increasingly unsatisfactory high voltage output was obtained and eventually the circuit ceased to function.

While I have shown a particular embodiment of my invention, it will of course be understood that I do not wish to be limited thereto since many modifications both in the circuit arrangement and in the instrumentalities employed may be made, and I, therefore, contemplate by the appended claims to cover any such modifications as fall within the true spirit and scope of my invention.

What I claim as new and desire to secure by Letters Patent of the United States is:

1. A deflection circuit for a cathode ray comprising a source of cyclically varying current, a transformer including a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after the current through said coil rises to said predetermined value, whereby the current in said deflection coil circuit after rising to said predetermined value is set into oscillation at a frequency determined by the effective inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding magnetically coupled to said windings and being additively connected in circuit with a portion of said primary winding in a manner to minimize the reactance of said other winding reflected to said deflection coil circuit, whereby said half cycle of oscillation occurs in minimum time.

2. A deflection circuit for a cathode ray comprising a source of cyclically varying current, a transformer including a primary winding connected to said source and a secondary winding, a cathode ray deflection coil connected in shunt with said secondary winding, the current through said coil increasing to a predetermined value in accordance with the increase in current from said source and the current from said source being cut off after the current through said coil rises to a predetermined value, whereby the current in said deflection coil circuit after rising to a value corresponding to said predetermined value is set into oscillation at a frequency determined by the inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding coupled to said windings and being additively connected in circuit with said one winding in a manner to include a smaller portion of said winding than is included by said deflection coil circuit, whereby the capacitance of said third winding circuit reflected to said deflection coil circuit is minimized, thereby said half cycle of oscillation occurs in minimum time.

3. A deflection circuit for a cathode ray comprising a source of cyclically varying current, a transformer including a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after rising to a predetermined value, whereby the current in said deflection coil circuit after rising to said predetermined value is set into oscillation at a frequency determined by the inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding coupled to said windings and being additively connected in circuit with a portion of said primary winding in a manner to minimize the capacitance of said third winding reflected to said deflection coil circuit, whereby said half cycle of oscillation occurs in minimum time.

4. A deflection circuit for a cathode ray comprising a source of cyclically varying current, a transformer including a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after the current through said coil rises to said predetermined value, whereby the current in said deflection coil circuit after rising to said predetermined value is set into oscillation at a frequency determined by the effective inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding coupled to said windings and being additively connected in circuit with that portion of said primary winding which develops substantially one half the voltage developed across said secondary, a load, means for supplying the voltage developed across said portion of said primary winding and said other winding to said load.

5. A deflection circuit for a cathode ray comprising a source of cyclically varying current, a transformer including a primary winding and a secondary winding, said primary winding being connected to said source, a cathode ray deflection coil connected in shunt with said secondary winding, the current through said coil increasing to a predetermined value in accordance with the increase in current from said source and the current from said source being suddenly cut off after the current through said coil rises to said predetermined value, whereby the current in said deflection coil circuit after rising to said predetermined value is set into oscillation at a frequency determined by the effective inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding coupled to said windings and being additively connected in circuit with a portion of said primary winding, said sudden cut off of current through said coil causing a high voltage to be developed in said windings, means for rectifying the voltage developed across said portion of said primary winding and said other winding, said portion of said primary proportioned with respect to said secondary to develop a smaller voltage thereacross than said secondary, whereby said rectified high voltage is obtained while the duration of said half cycle of oscillation is substantially unaffected.

6. A deflection circuit for gradually deflecting a cathode ray in one direction from a starting point and then returning said ray rapidly in the opposite direction to said starting point and for supplying energizing potentials to said cathode ray from said deflection circuit comprising a source of cyclically varying current, a transformer including a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after the current through said coil rises to said predetermined value, whereby the current in said deflection coil circuit after rising to said predetermined value is set into oscillation at a frequency determined by the effective inductance and capacitance of said deflection coil circuit thereby said current decreases in said deflection coil and flows in the reverse direction, means for damping said current oscillations after the first half cycle of said oscillations, whereby the current through said coil may be caused to uniformly decrease substantially unaffected by said oscillations after said first half cycle of oscillation, another winding coupled to said windings and being additively connected in circuit with a portion of said primary winding, said sudden cut off of current through said coil causing a high voltage to be developed in said windings, means for rectifying the voltage developed across said portion of said primary winding and said other winding, said portion of said primary being proportioned with respect to said secondary winding to develop a voltage of the order of one half the voltage developed across said secondary, whereby high energizing potentials are obtained while half cycle of oscillation is substantially unaffected and said cathode ray is returned to said starting point in minimum time.

References Cited in the file of this patent

UNITED STATES PATENTS

| | | |
|---|---|---|
| 2,523,108 | Friend | Sept. 19, 1950 |
| 2,536,857 | Schade | Jan. 2, 1951 |
| 2,606,304 | Moore | Aug. 5, 1952 |
| 2,627,051 | Barco | Jan. 27, 1953 |
| 2,627,052 | Helpert et al. | Jan. 27, 1953 |
| 2,644,104 | Flyer et al. | Jan. 30, 1953 |